United States Patent
Hughes et al.

(10) Patent No.: US 6,769,750 B2
(45) Date of Patent: Aug. 3, 2004

(54) MECHANICAL JOINT INCLUDING ANGLE BRACKET THEREFOR

(75) Inventors: Gary L. Hughes, Jasper, IN (US); Jay M. Henriott, Jasper, IN (US)

(73) Assignee: Kimball International, Inc., Jasper, IN (US)

(*) Notice: Subject to any disclaimer, the term of this patent is extended or adjusted under 35 U.S.C. 154(b) by 0 days.

(21) Appl. No.: 10/328,892

(22) Filed: Dec. 24, 2002

(65) Prior Publication Data

US 2003/0090183 A1 May 15, 2003

Related U.S. Application Data

(63) Continuation of application No. 09/758,926, filed on Jan. 11, 2001, now abandoned.

(51) Int. Cl.[7] ............................................. A47B 47/00
(52) U.S. Cl. .................... 312/265.5; 312/263; 108/193
(58) Field of Search ................................ 312/107, 111, 312/108, 257.1, 263, 265.5, 348.2; 108/193, 149, 109; 403/240, 382, 403, 205, 243; 248/247, 248, 250; 211/187, 186

(56) References Cited

U.S. PATENT DOCUMENTS

| | | | |
|---|---|---|---|
| 325,696 A | | 9/1885 | Post |
| 892,542 A | * | 7/1908 | McMaster .................. 248/248 |
| 1,066,165 A | | 7/1913 | Tietz |
| 2,709,562 A | * | 5/1955 | Hamilton ................. 248/216.1 |
| 3,059,983 A | | 10/1962 | Storm |
| 3,363,867 A | | 1/1968 | Zackrisson |
| 3,398,981 A | * | 8/1968 | Vincens ................. 108/158.11 |
| 3,594,056 A | | 7/1971 | Sager |
| 3,596,942 A | | 8/1971 | Zoebelein |
| 3,749,465 A | * | 7/1973 | Newcomer .................. 312/245 |
| 3,759,191 A | | 9/1973 | Freeman |
| 3,977,742 A | | 8/1976 | Rovere |
| 4,120,598 A | | 10/1978 | Zernig et al. |
| 4,146,140 A | * | 3/1979 | Suter et al. ................. 108/109 |
| 4,178,047 A | | 12/1979 | Welch |
| 4,408,812 A | | 10/1983 | Krautwurst |
| 4,439,971 A | | 4/1984 | Rutherford |
| 4,542,702 A | | 9/1985 | Johansson |
| 4,909,465 A | | 3/1990 | Lyman |
| 4,973,187 A | | 11/1990 | Sauder |
| 5,061,111 A | * | 10/1991 | Hosokawa ............... 403/232.1 |
| 5,249,857 A | | 10/1993 | Suzuki |
| 5,478,145 A | | 12/1995 | Kamachi |
| 5,486,041 A | | 1/1996 | Sykes |
| 5,536,078 A | | 7/1996 | Novikoff |
| 5,954,306 A | * | 9/1999 | Hoover ....................... 108/108 |
| 6,065,724 A | | 5/2000 | Arslan et al. |
| 6,302,283 B1 | * | 10/2001 | Yeh ............................ 108/109 |

* cited by examiner

Primary Examiner—Janet M. Wilkens
(74) Attorney, Agent, or Firm—Baker & Daniels

(57) ABSTRACT

A mechanical joint for joining a pair of structural components. The mechanical joint includes a bracket having a pair of legs, a first recess formed in the first structural component, and a second recess formed in the second structural component. The first recess accommodates a first leg of the bracket, while the second recess accommodates a second leg of the bracket. The first leg of the bracket is positioned in the first recess and is affixed to the first structural component. The second structural component is placed in abutting relationship with the first structural component, covering the first recess and resting atop the second leg of the bracket, with the second leg of the bracket positioned in the second recess.

27 Claims, 4 Drawing Sheets

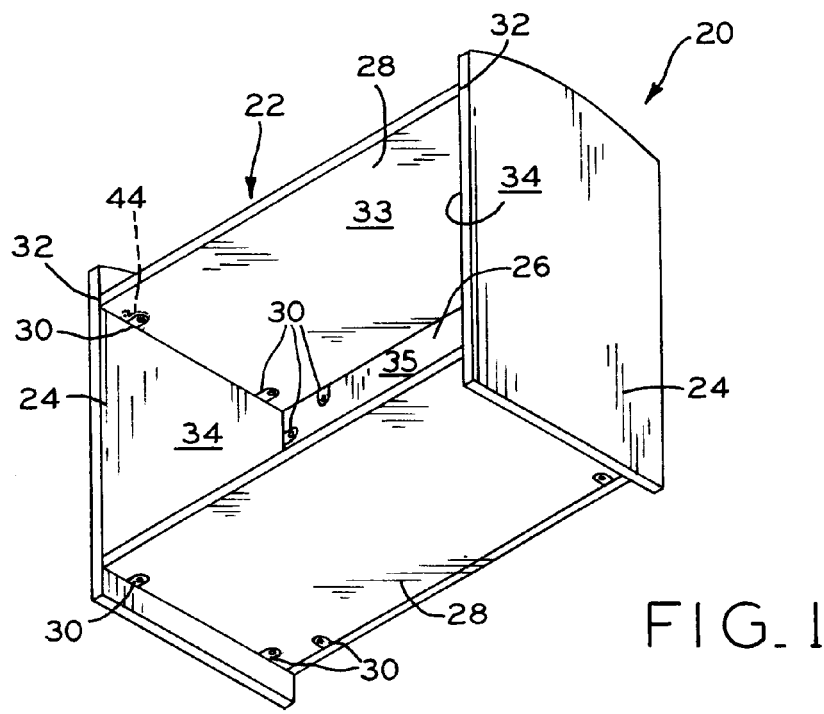
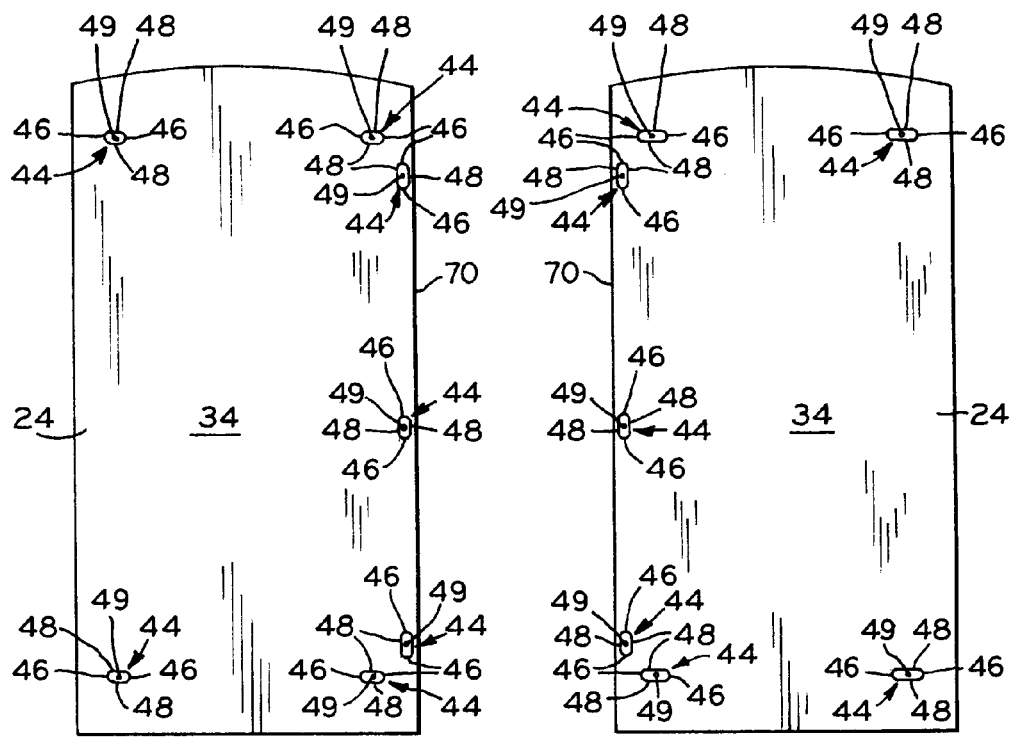

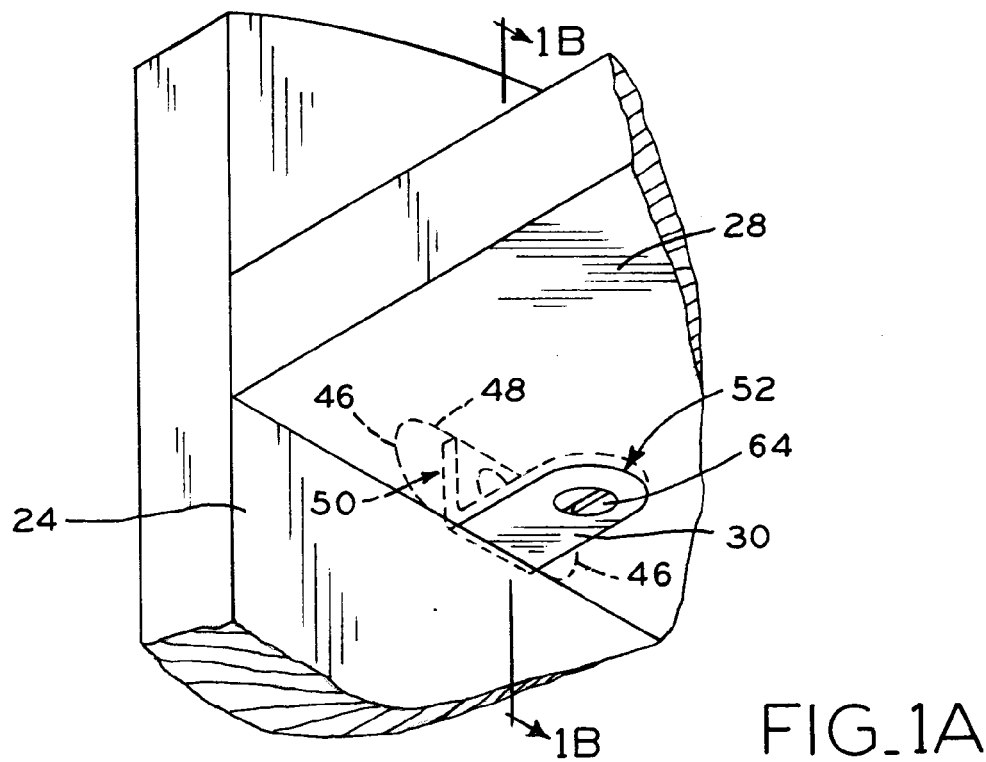
FIG_1A
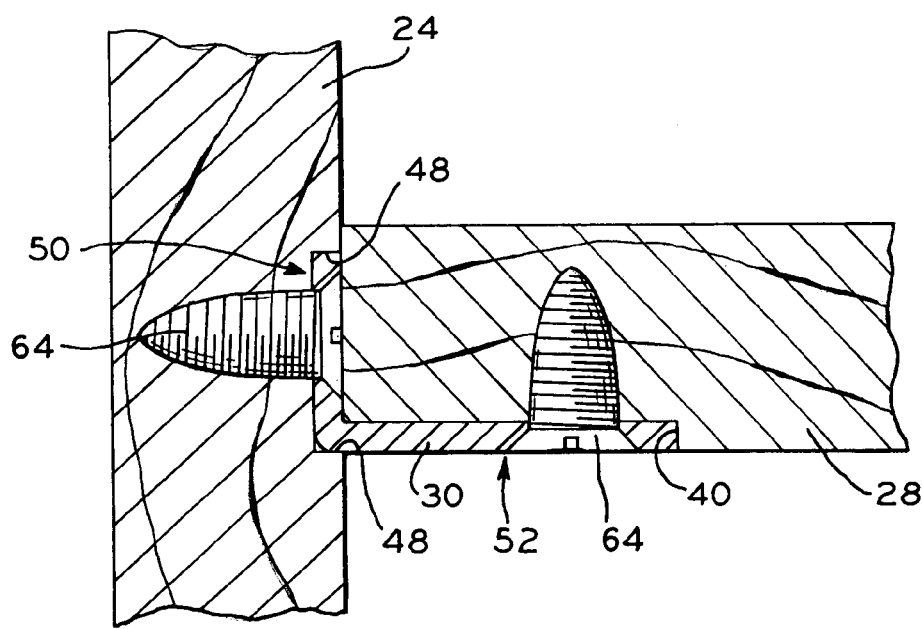
FIG_1B

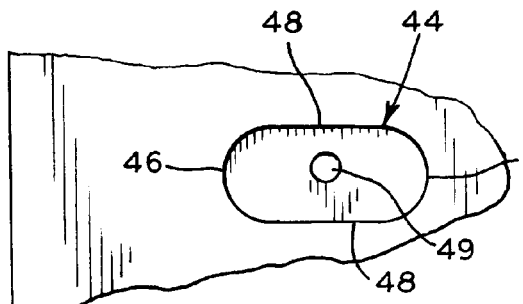 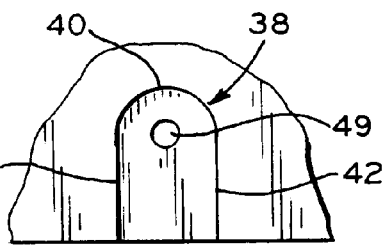
FIG_7  FIG_8
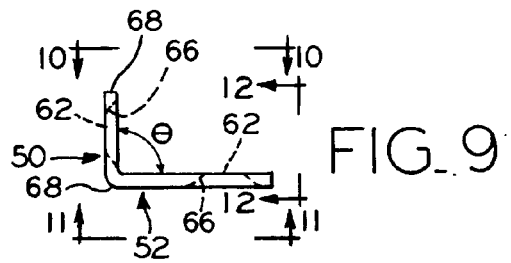 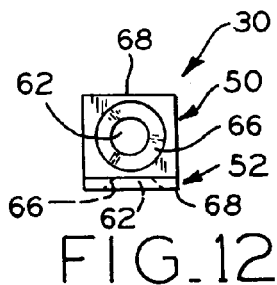
FIG_9  FIG_12
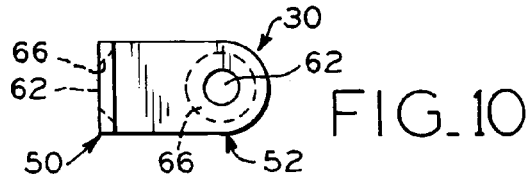
FIG_10
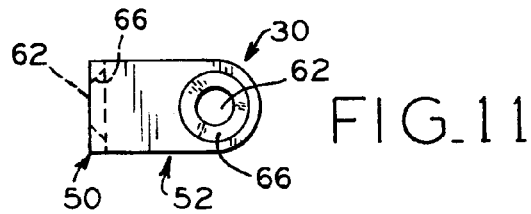
FIG_11
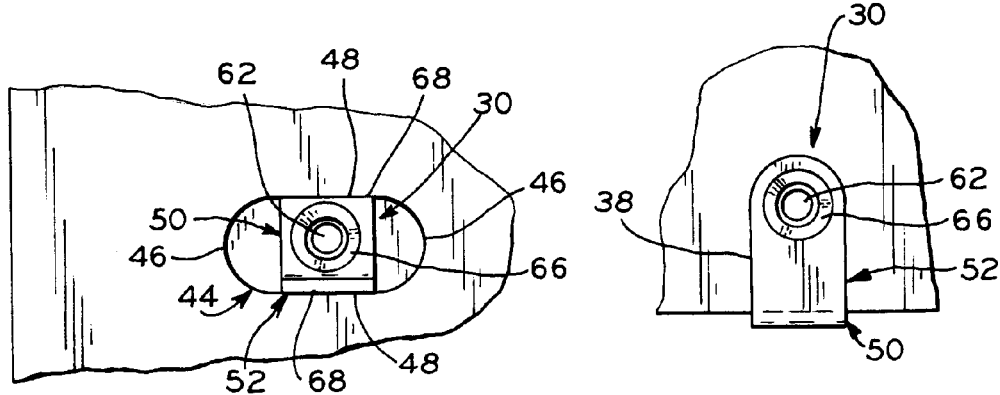 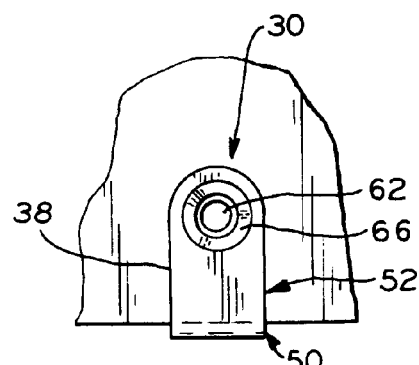
FIG_13  FIG_14

MECHANICAL JOINT INCLUDING ANGLE BRACKET THEREFOR

This application is a continuation of U.S. application Ser. No. 09/758,926, filed Jan. 11, 2001 and now abandoned.

BACKGROUND OF THE INVENTION

1. Field of the Invention

The present invention relates to a mechanical joint, and, more particularly to an improved angle bracket for joining a pair of structural components, e.g., panels used in the construction of various items of furniture including, e.g., tables, chairs, shelving, and cabinets.

2. Description of the Related Art

In general, mechanical joints are widely used to construct items of furniture formed, at least in part, from abutting structural components. Such items of furniture, include, e.g., tables, chairs, shelving units, and cabinets. Many different types of fasteners are commonly used in constructions where abutting structural components are secured to one another. For example, L-shaped brackets, wooden cleats, mortise and tenon combinations, and dowel pins can be utilized to affix abutting components used to form items of furniture.

One example of a fastener used to secure abutting structural components of, e.g., a cabinet or table is an elongated, metal L-shaped bracket. These fasteners are designed to rest atop and be affixed to the outer surfaces of abutting components. A plurality of apertures are drilled through each leg of the L-shaped bracket through which fasteners, such as screws, are placed. In use, a first leg of the bracket is fixed to a first one of the structural components, the second of the structural components is positioned adjacent to the first component, and the second leg of the bracket is fixed to the second structural component. This type of fastener can be relatively large. The size and the orientation (i.e., with each leg exposed and resting atop a structural component) of these brackets makes them visible and, therefore, not aesthetically pleasing.

Other mechanical joints used in the construction of furniture, and, particularly, shelving include wooden cleats. Wooden cleats typically comprise an elongate piece of wood having a square or rectangular cross section. In use, the cleat is placed in the joint formed by adjacent structural components and is affixed to each of the structural components. A plurality of fasteners are utilized to secure the wooden cleat to the first component. The second component (commonly a shelf) is positioned atop the wooden cleat. Fasteners can be utilized to secure the second structural component in position atop the wooden cleat. These types of joints are most often used when supporting a shelf, however, they may be used in the construction of other items of furniture including chairs and tables. These types of mechanical joints are relatively large in size, and are entirely exposed in use, and, therefore, are not aesthetically pleasing.

Additional forms of mechanical joints utilized in the construction of items of furniture include tongue and groove joints as well as mortise and tenon combinations. A tongue and groove joint includes one structural component having a groove and a second structural component having a tongue extending a similar length as the groove. The tongue is of similar shape to that of the groove and is interference fit therein to effect affixation of the components. Similar to the tongue and groove joint is a mortise and tenon combination. A mortise, which is a rectangular aperture, is provided in one component, while a tenon, which is a rectangular projection, is provided on the second component. The tenon is interference fit into the mortise to provide a secure link between the components. Both tongue and groove, and mortise and tenon joints require significant, and somewhat difficult machining producing tight tolerances to enable a good interference fit. The complicated machining of these types of fasteners increases both the time and expense of manufacturing.

Another fastener used in the construction of furniture is a dowel pin. A plurality of apertures are drilled into each structural component to be secured, so that the apertures in one component align with the apertures in the second component. The tolerance of both the size and the spacing of the apertures must be extremely tight so that the dowel pins may be interference fit into the apertures and so that the mating apertures will properly align. The exacting machining required by dowel pins increases both the time and cost of manufacturing.

It is desired to provide a mechanical joint for use in furniture which is simple, durable, relatively low in cost, substantially hidden in use, and universal in application.

SUMMARY OF THE INVENTION

The present invention provides an angle bracket connector for use in joining a pair of structural components used, e. g., to construct furniture components. The bracket has two legs, one for engaging each of the components to be joined. In one exemplary embodiment, one leg is longer than the other. In another exemplary embodiment, one leg has a rounded end, while the other leg has a square end. A recess is formed in one of the structural components, and is sized to accommodate a leg of the bracket. In one exemplary embodiment, the geometries of the recess and the bracket itself cooperate to prevent rotation of the bracket. In use, one leg of the bracket is positioned in the recess, with the other leg protruding therefrom for support of the second structural component. The recess is positioned such that when the structural components are placed in abutting relationship, the recess, and, thus, the leg positioned therein, is hidden from view by the end of the second structural component. For the purposes of this document, "abutting" is meant to encompass situations in which the components are actually touching as well as situations where the components are in close proximity.

The invention, in one form thereof, comprises a mechanical joint including a first structural component having a face, a second structural component having an end, and a bracket. In this form of the current invention, the bracket includes a pair of legs which join the first structural component to the second structural component. The first structural component includes a first recess with a first one of the legs positioned therein. The bracket is affixed to the first structural component, with the end of the second structural component abutting the face of the first structural component, so that the first leg and the first recess are both substantially concealed by the end of the second structural component.

The invention, in another form thereof, comprises a item of furniture having a mechanical joint for affixing abutting structural components. The item of furniture of this form of the present invention comprises a first structural component and a second structural component, with the second structural component having an end abutting a face of the first structural component. The item of furniture further includes a bracket having a pair of legs disposed at an angle to each other, with the bracket joining the first and the second structural components. A first one of the legs of the bracket is disposed between the end of the second structural component and the face of the first structural component and is affixed to the first structural component. The first structural component includes a first recess in which the first leg of the bracket is disposed, whereby the first leg of the bracket is concealed by the end of the second structural component.

The invention, in a further form thereof, comprises a method of constructing a item of furniture. The method of this form of the current invention includes the steps of: providing a first structural component having a face and a second structural component having an end, forming a first recess in the face of the first structural component, providing a bracket having a first leg and a second leg, positioning the first leg of the bracket in the first recess, securing the first leg to the first structural component, and abutting the second structural component with the first structural component such that the second structural component conceals the first leg of the bracket while resting atop the bracket.

An advantage of the present invention is that the bracket is substantially hidden from view and yet is relatively strong.

Another advantage of the present invention is that it is simple in construction.

A further advantage of the present invention is that it is universal in application in that it may be used in the construction of any type of structure having abutting components including, e.g., tables, chairs, shelving, and cabinets.

Yet another advantage of the present invention is that it is relatively low in cost.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a perspective view of a item of furniture constructed in accordance with the present invention;

FIG. 1A is a partial perspective view of a joint formed in accordance with the present invention;

FIG. 1B is a sectional view thereof;

FIG. 2 is a side elevational view of one end component thereof;

FIG. 3 is a side elevational view of the other end component of the item of furniture illustrated in FIG. 1;

FIG. 7 is a fragmentary elevational view of a structural component having an oblong recess therein;

FIG. 8 is a fragmentary elevational view of a structural component having a rounded recess therein;

FIG. 9 is a side elevational view of an angle bracket connector in accordance with the present invention;

FIG. 10 is a top elevational thereof;

FIG. 11 is a bottom elevational view thereof;

FIG. 12 is an end elevational view thereof;

FIG. 13 is the fragmentary view of FIG. 7 illustrating one leg of the bracket disposed in the oblong recess; and FIG. 14 is the fragmentary view of FIG. 8 illustrating a second leg of the bracket disposed in the rounded recess.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 4:
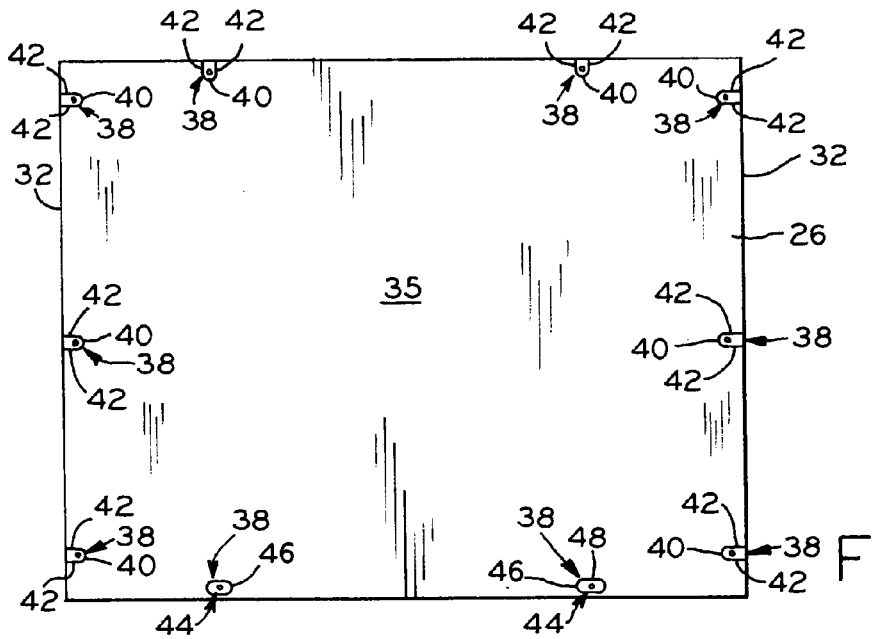
FIG. 4 is a front elevational view of the back component of the item of furniture illustrated in FIG. 1.
Figure 5:
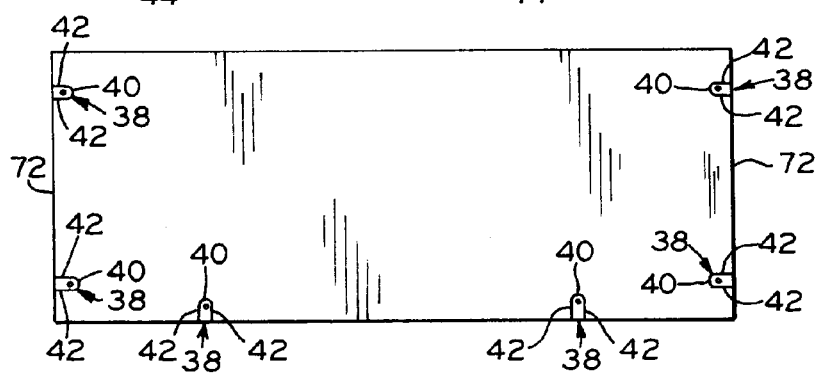
FIG. 5 is a bottom elevational view of both the top and the bottom components of the item of furniture shown in FIG. 1.

Referring to FIG. 1, furniture 20 is constructed from a plurality of structural components including panels such as end or side panels 24 (FIGS. 2 and 3), back panel 26 (FIG. 4), and top and bottom panels 28 (FIG. 5). Furniture 20, can be, e.g., a television stand. Top and bottom panels 28 share the same construction, as illustrated in FIGS. 1 and 5. Referring to FIGS. 6, and 9–12, brackets 30 are designed to secure adjacent structural components to one another to construct furniture 20 (FIG. 1). Each end panel 24 is fixed to back panel 26, and top and bottom panels 28 are disposed between end panels 24, being secured at each end to end panels 24 by brackets 30.

Furniture constructed utilizing the mechanical joint of the current invention can include many types of furnishing for a home or office, including, e.g., a desk, a bookcase, a television stand, cabinets, or the like. When constructing this type of furniture, structural components are placed in abutting relationship, with an end of one structural component, such as end 32 of back panel 26, abutting a surface of another structural component, such as surface 34 of end panel 24 (FIG. 1). The abutting relationship between structural components of furniture 20 allows at least a portion of brackets 30 to be hidden from view as will be discussed herein below.

Referring to FIGS. 2, 3, 4, and 5, end panels 24, back panel 26, as well as top and bottom panels 28 include a plurality of recesses 38, 44. Recesses 44 of end panels 24 are positioned along the edge of end panels 24 and, in use, align with a number of recesses 38 in back panel 26 as well as a number of recesses 38 in top and bottom panels 28. This allows one leg of brackets 30 to be received in recess 44 in end panel 24 and the second leg of brackets 30 to be received in recesses 38 in back panel 26 and top/bottom panels 28.

As illustrated in FIGS. 2–8, 13 and 14, two different types of recesses (38, 44) are formed in the structural components, each type having a different shape. First recess 38 is machined, e.g., into back component 26 (FIG. 4) and includes rounded end 40 at one end intersecting side walls 42 extending to the opposite end thereof. The end of recess 38 opposite rounded end 40 is open. Second recess 44 has an oblong or generally elliptical shape. Second recess 44 includes a pair of rounded ends 46, one at either end thereof, with side walls 48 extending therebetween.

Figure 6:
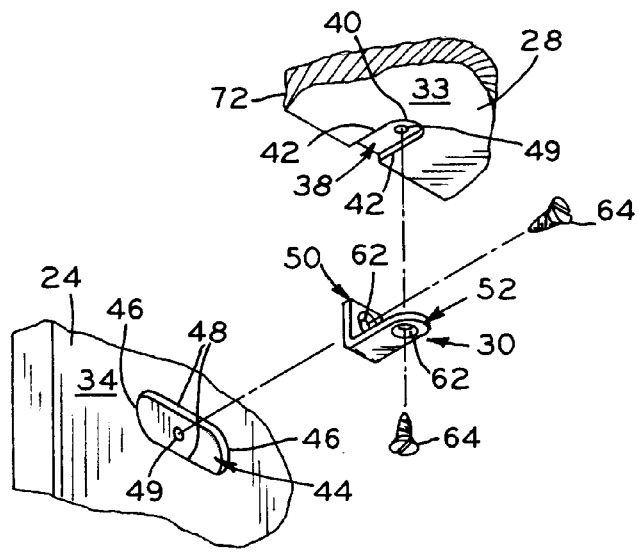
FIG. 6 is a fragmentary exploded perspective view of a mechanical joint in accordance with the present invention.

Recesses 44 are disposed in the structural components of furniture 20 in either a substantially vertical or a substantially horizontal orientation depending upon the orientation of the structural components to be joined thereto. For example, recesses 44 along back side 70 of end panels 24 are disposed substantially vertically, while recesses 44 positioned generally along the upper and lower edges of panels 24 are disposed substantially horizontally. Generally, recesses 44 are oriented similar to the structural component to be affixed thereto via bracket 30. Since furniture 20 includes only horizontally and vertically oriented structural components, only horizontally and vertically oriented recesses are required. In items of furniture having structural components oriented other than horizontally or vertically, recesses 44 would be positioned accordingly. Recesses 38 and 44 are provided with pre-drilled apertures 49 for affixation of bracket 30 (FIGS. 6–8). In one exemplary, apertures 49 in recesses 38 are positioned slightly off center (on the order of 0.5 mm toward rounded end 40) with respect to the mating recess in bracket 30. The off center position of apertures 49 in recess 38 draws the relevant structural components together.

Furniture 20 is constructed such that abutting structural components are positioned with an end of a first structural component covering an oblong recess formed in a face of a second structural component. With particular reference to furniture 20 illustrated in FIG. 2, ends 32 (FIG. 4) of back panel 26 abut end panels 24 such that back panel 26 covers oblong recesses 44 positioned along back side 70 of end panels 24. Similarly, ends 72 of top and bottom panels 28 abut end panels 24 such that top and bottom panels 28 cover oblong recesses 44 positioned generally along the top and bottom edges of end panels 24, respectively. Recesses 38 and 44 are positioned on adjacent structural components so as to align with one another, allowing affixation of brackets 30 thereto. Recesses 38 and 44 have a depth allowing the structural components they are formed in to be placed in abutting relationship. For example, with bracket 30 disposed in recesses 38 and 44, and back panel 26 abuts end panel 24 so as to cover recess 44, and the leg of bracket 30 contained in recess 44 so that this leg of bracket 30 is hidden from view. As illustrated in FIGS. 1 and 4, recesses 38 are formed in surface 35 which comprises the forward face of back panel 26. Recesses 38 are thusly positioned for illustrative purposes only. In use, recesses 38 could be formed in the back face (not shown) of back panel 26 so that bracket 30 would be entirely concealed from view. Recess 38 is not essential for hiding the leg of bracket 30 contained in recess 44 and, therefore, may be excluded.

Referring to FIG. 6, bracket 30 is illustrated prior to affixation to end panel 24 and panel 28. Recess 44 is machined into end panel 24 and receives square leg 50 of bracket 30. Similarly, recess 38 is machined into panel 28 for receiving rounded leg 52 of bracket 30. In use, square leg 50 is secured within oblong recess 44 in end panel 24, and panel 28 is thereafter positioned in abutting relationship to end panel 24 such that rounded leg 52 of bracket 30 is received within recess 38 of panel 28. In one exemplary embodiment, rounded leg 52 of bracket 30 is affixed to panel 28 via fastener 64. It is further contemplated by the present invention to provide a bracket 30 for securing a generally horizontal structural component, wherein the rounded leg of the bracket is without an aperture to accommodate fastener 64. When assembled, end 72 of panel 28 covers oblong recess 44 and square leg 50 of bracket 30, thus concealing square leg 50 of bracket 30 from view. In use, rounded leg 52 of bracket 30 is substantially flush with aperture 38 as well as surface 33 of panel 28. FIGS. 1A and 1B illustrate bracket 30 secured to panel 28 and end panel 24.

The current invention further contemplates a construction in which recess 38 extends into end 72 of panel 28 such that when bracket 30 is placed therein, bracket 30 is flush with end 72 and surface 33 of panel 28. In such an embodiment, recess 44 in end panel 24 would be unnecessary. In such an embodiment, bracket 30 would be affixed to surface 34 of end panel 24 with panel 28 being placed in abutting relationship with end panel 24 such that bracket 30 is received in recess 38.

Referring now to FIGS. 9–11, bracket 30 is, in one exemplary embodiment, constructed from steel and includes legs 50, 52. Generally, bracket 30 is constructed from material having sufficient strength to maintain the structural integrity of the furniture which it is used to form and to support the items which the furniture is made to support (e.g., a television on a television stand). Bracket 30 is L-shaped having square leg 50 disposed approximately perpendicularly from rounded leg 52. Referring to FIG. 9, the angle Θ between legs 50 and 52 of bracket 30 is illustrated as being approximately 90°, however, Θ may be at any acute or obtuse angle necessary to position a pair of structural components as desired. As is known in the art, such a construction would require a mitered end on one of the structured components to be joined, so that the structural components could be placed in abutting relationship. As shown in FIGS. 9–12, legs 50 and 52 are each provided with aperture 62 through which fastener 64 (FIG. 6), such as a screw or the like, may be placed. Chamfer 66 accommodates the head of fastener 64 so that fastener 64 is flush with the leg of bracket 30 which it is utilized to secure.

Referring to FIGS. 13 and 14, legs 50 and 52 of bracket 30 are shown disposed in recesses 44 and 38, respectively. Recess 38 is machined to substantially the same size and shape of leg 52. Square leg 50 is disposed in oblong recess 44 such that each of the pair of oppositely disposed flat edges 68 of bracket 30 are parallel to side walls 48 of recess 44 so that rotation of bracket 30 is thereby limited. In one exemplary embodiment, recess 44 is dimensioned such that square leg 50 fits snugly between side walls 48 so that rotation of bracket 30 about fastener 64 in leg 50 is prohibited. In alternative embodiments, the distance between side walls 48 will be such that slight rotation of leg 50 will be allowed. However, it is preferred that recess 44 is constructed such that rotation of leg 50 and consequently bracket 30 is substantially prohibited. Recess 44 is machined to have an oblong, or generally elliptical shape, with rounded ends 46, since a square recess is more difficult to machine. However, recess 44 may be of any shape which prevents rotation of bracket 30 while being sized for concealment by an abutting structural component. Furthermore, leg 50 can be any non-rounded (e.g., polygonal) shape that will cooperate with the geometry of recess 44 to substantially prohibit rotation of bracket 30.

Bracket 30 is substantially universal in application. Brackets 30 may used to secure any first and second structural components together to produce a portion of a item of furniture, such as furniture 20. Brackets 30 may be used to secure an end panel to a back panel, a top panel to an end panel, or a bottom panel to a back panel, for example. While being substantially universal in application, and relatively strong, brackets 30 are at least partially (and, many times, completely) hidden from view in any of the mentioned orientations to provide an aesthetically pleasing item of furniture.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mechanical joint comprising:
a first structural component having a face;
a second structural component having an end;

a bracket having a pair of legs, said bracket joining said first and said second structural components in abutting relationship, said first structural component having a first recess, with the first one of said legs positioned therein, said bracket affixed to said first structural component, said end of said second structural component abutting said face of said first structural component, whereby said first leg and said first recess are both substantially concealed by said end of said second structural component, said first recess comprising a recess having a pair of rounded ends joined by a pair of substantially straight side walls.

2. The mechanical joint of claim 1, wherein said second structural component includes a second recess sized to accommodate a second one of said pair of legs.

3. The mechanical joint of claim 1, wherein said legs are integral, each with the other.

4. The mechanical joint of claim 1, wherein said legs are separated by a 90° angle.

5. The mechanical joint of claim 1, wherein said first structural component comprises an end wall of a item of furniture.

6. The mechanical joint of claim 5, wherein said second structural component comprises a back of said item of furniture, said end wall joined to said back by said bracket.

7. The mechanical joint of claim 5, wherein said second structural component comprises a generally horizontal member of said item of furniture, said generally horizontal member joined to said end wall by said bracket.

8. The mechanical joint of claim 1, wherein said leg positioned in said recess includes a polygonal end having a side abutting one of said substantially straight side walls of said first recess.

9. The joint as recited in claim 1, wherein said bracket includes a first chamfered aperture in said first leg, and wherein the joint further comprises a fastener traversing said first chamfered aperture to affix said first leg to said first structural component, said fastener being flush with said first leg of said bracket.

10. An item of furniture having a mechanical joint affixing abutting structural components, said item of furniture comprising:
 a first structural component and a second structural component, said second structural component having an end abutting a face of said first structural component; and
 a bracket having a pair of legs disposed at an angle to each other, said bracket joining said first and said second structural components, a first one of said legs disposed between said end of said second structural component and said face of said first structural component, said first one of said legs affixed to said first structural component, said first structural component having a first recess in which said first leg is disposed, said first recess comprising a recess having a pair of rounded ends joined by a pair of substantially straight side walls, whereby said first leg is substantially concealed by said end of said structural component.

11. The item of furniture as recited in claim 10, wherein said second structural component includes a second recess in which a second one of said pair of legs is disposed.

12. The item of furniture as recited in claim 11, wherein said second recess is of substantially the same shape as the second leg of said bracket.

13. The item of furniture as recited in claim 10, wherein said first recess and said first leg have cooperating geometry means for prohibiting rotation of said bracket.

14. The item of furniture as recited in claim 10, wherein said first leg includes a non-rounded end abutting one of said substantially straight side walls of said first recess.

15. The item of furniture as recited in claim 14, wherein said non-rounded end comprises a square end.

16. The item of furniture as recited in claim 10, wherein said angle comprises a 90° angle.

17. The item of furniture as recited in claim 10, wherein said first structural component comprises an end wall of the item of furniture.

18. The item of furniture as recited in claim 17, wherein said second structural component comprises a back of the item of furniture, said end wall affixed to said back by said bracket.

19. The item of furniture as recited in claim 18, further comprising:
 a second end wall, said second end wall affixed to said back by a second bracket; and
 a substantially horizontal member spanning said end walls, said substantially horizontal member affixed to each of said end walls by a third and a fourth bracket, respectively.

20. The item of furniture as recited in claim 10, wherein said bracket includes a first chamfered aperture in said first leg, and wherein the item of furniture further comprises a fastener traversing said first chamfered aperture to affix said first leg to said first structural component, said fastener being flush with said first leg of said bracket.

21. An item of furniture having a mechanical joint affixing abutting structural components, said item of furniture comprising:
 a first structural component and a second structural component, said second structural component having an end abutting a face of said first structural component; and
 a bracket having a pair of legs disposed at an angle to each other, said bracket joining said first and said second structural components, a first one of said legs disposed between said end of said second structural component and said face of said first structural component, said first one of said legs affixed to said first structural component, said first structural component having a first recess in which said first leg is disposed, whereby said first leg is substantially concealed by said end of said second structural component, wherein said bracket includes a first chamfered aperture in said first leg, and wherein the item of furniture further comprises a fastener traversing said first chamfered aperture to affix said first leg to said first structural component, said fastener being flush with said first leg of said bracket.

22. The item of furniture as recited in claim 21, wherein said first recess comprises a recess having a pair of rounded ends joined by a pair of substantially straight side walls.

23. The item of furniture as recited in claim 22, wherein said first leg includes a non-rounded end abutting one of said substantially straight side walls of said first recess.

24. The item of furniture as recited in claim 23, wherein said non-rounded end comprises a square end.

25. A method of constructing a item of furniture, comprising:
 providing a first structural component and a second structural component, said first structural component having a face, said second structural component having an end;
 forming a first recess in said face of said first structural component wherein said recess has a pair of rounded ends joined by a pair of substantially straight side walls;

providing a bracket having a first leg and a second leg;
positioning said first leg in said first recess;
securing said first leg to said first structural component; and
abutting said end of said second structural component with said face of said first structural component such that said second structural component substantially conceals said first leg and rests atop said second leg of said bracket.

26. The method of claim 25, further comprising the step of:
securing said second leg of said bracket to said second structural component.

27. The method of claim 25, further comprising:
forming a recess in said second structural component; and
positioning said second leg of said bracket in said second recess.

\* \* \* \* \*